(12) United States Patent
Norris et al.

(10) Patent No.: US 6,247,310 B1
(45) Date of Patent: *Jun. 19, 2001

(54) SYSTEM AND METHOD FOR CONTROL OF FUEL AND AIR DELIVERY IN A BURNER OF A THERMAL-CYCLE ENGINE

(75) Inventors: Michael Norris, Manchester; Dean L. Kamen, Bedford; Christopher C. Langenfeld, Nashua, all of NH (US)

(73) Assignee: New Power Concepts LLC, Manchester, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/517,686

(22) Filed: Mar. 2, 2000

Related U.S. Application Data

(63) Continuation-in-part of application No. 09/115,383, filed on Jul. 14, 1998, now Pat. No. 6,062,023.
(60) Provisional application No. 60/052,535, filed on Jul. 15, 1997.

(51) Int. Cl.[7] .................................................. F01B 29/10
(52) U.S. Cl. .................................. 60/521; 60/522; 60/526
(58) Field of Search ............................. 60/520, 523, 524, 60/526, 521, 522, 517

(56) References Cited

U.S. PATENT DOCUMENTS

| | | | |
|---|---|---|---|
| 4,085,588 | * 4/1978 | Reams et al. | 60/517 |
| 4,231,222 | 11/1980 | Fenton | 60/524 |
| 4,633,667 | * 1/1987 | Watanabe et al. | 60/517 |
| 4,768,341 | 9/1988 | Nozaki et al. | 60/524 |
| 4,881,372 | 11/1989 | Naito | 60/521 |
| 4,977,742 | 12/1990 | Meijer | 60/525 |
| 5,005,349 | 4/1991 | Momose et al. | 60/517 |
| 5,065,579 | 11/1991 | Monahan | 60/524 |
| 5,590,626 | * 1/1997 | Cho | 60/517 |
| 5,735,681 | 4/1998 | Cheng | 431/20 |
| 5,954,039 | 9/1999 | Doering et al. | 123/692 |
| 6,062,023 | * 5/2000 | Kerwin et al. | 60/520 |

* cited by examiner

*Primary Examiner*—Hoang Nguyen
(74) *Attorney, Agent, or Firm*—Bromberg & Sunstein LLP

(57) ABSTRACT

A method of combusting fuel and air in a burner of an external combustion engine having a heater head. The fuel and air are combined to form a fuel-air mixture which is characterized by a fuel-air ratio. An exhaust gas product is produced when the fuel-air mixture is combusted in the burner of the external combustion engine. A flame is formed by igniting the fuel-air mixture at a first fuel-air ratio produced by a first air flow rate and a fuel flow rate. The air flow rate is then increased to produce a second fuel-air ratio. The fuel flow rate is also controlled based upon a temperature of the heater head of the external combustion engine. The flame is maintained at the second fuel-air ratio by adjusting the air flow rate based on the fuel flow rate. The external combustion engine may be, for example, a Stirling cycle engine.

12 Claims, 12 Drawing Sheets

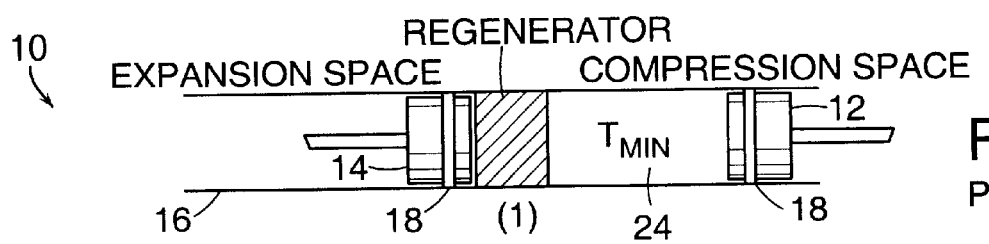
FIG. 1a
PRIOR ART
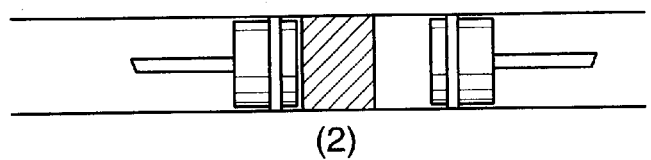
FIG. 1b
PRIOR ART
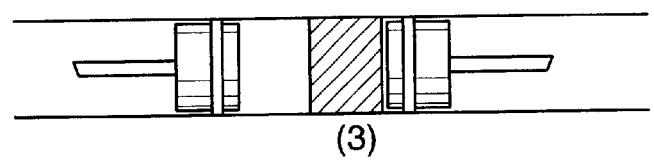
FIG. 1c
PRIOR ART
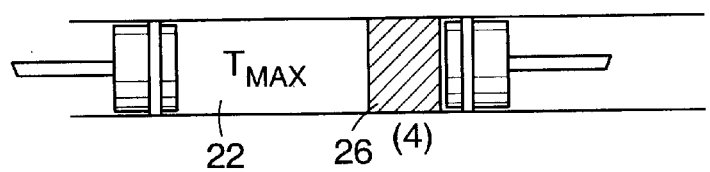
FIG. 1d
PRIOR ART
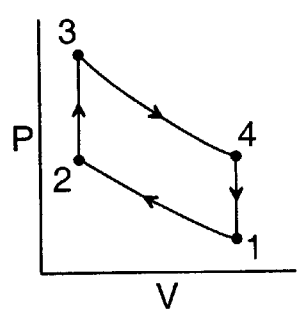
FIG. 1e
PRIOR ART
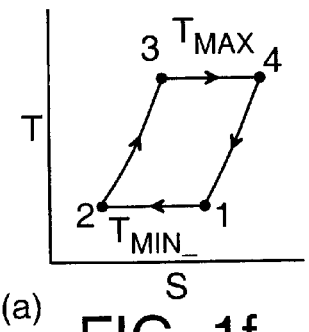
(a) FIG. 1f
PRIOR ART

"UNWRAPPED" VIEW OF HEADER DUCTS

SYSTEM AND METHOD FOR CONTROL OF FUEL AND AIR DELIVERY IN A BURNER OF A THERMAL-CYCLE ENGINE

The present application is a continuation-in-part of U.S. application Ser. No. 09/115,383, filed Jul. 14, 1998, now U.S. Pat. No. 6,062,023, and claims priority from 06/052,535, filed Jul. 15, 1997, both of which applications are herein incorporated by reference.

TECHNICAL FIELD

The present invention pertains to improvements to a Stirling cycle heat engine or refrigerator and more particularly to improvements relating to mechanical and thermal components of a Stirling cycle heat engine or refrigerator which contribute to increased engine operating efficiency and lifetime, and to reduced size, complexity and cost.

BACKGROUND OF THE INVENTION

Stirling cycle machines, including engines and refrigerators, have a long technological heritage, described in detail in Walker, *Stirling Engines,* Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. The Stirling cycle refrigerator is also the mechanical realization of a thermodynamic cycle which approximates the ideal Stirling thermodynamic cycle. In an ideal Stirling thermodynamic cycle, the working fluid undergoes successive cycles of isovolumetric heating, isothermal expansion, isovolumetric cooling and isothermal compression. Practical realizations of the cycle, wherein the stages are neither isovolumetric nor isothermal, are within the scope of the present invention and may be referred to within the present description in the language of the ideal case without limitation of the scope of the invention as claimed.

Various aspects of the present invention apply to both Stirling cycle engines and Stirling cycle refrigerators, which are referred to collectively as Stirling cycle machines in the present description and in any appended claims. Additional aspects of Stirling cycle machines and improvements thereto are discussed in a co-pending U.S. patent application entitled "Stirling Cycle Machine Improvements," filed Jul. 14, 1998, and incorporated herein by reference.

The principle of operation of a Stirling cycle engine is readily described with reference to FIGS. 1a–1f, wherein identical numerals are used to identify the same or similar parts. Many mechanical layouts of Stirling cycle engines are known in the art, and the particular Stirling engine designated generally by numeral 10 is shown merely for illustrative purposes. In FIGS. 1a to 1d, a piston 12 (otherwise referred to herein as a "compression piston") and a second piston (also known as an "expansion piston") 14 move in phased reciprocating motion within cylinder 16. Compression piston 12 and expansion piston 14 may also move within separate, interconnected, cylinders. Piston seals 18 prevents the flow of a working fluid contained within cylinder 16 between piston 12 and piston 14 from escaping around either piston 12. The working fluid is chosen for its thermodynamic properties, as discussed in the description below, and is typically helium at a pressure of several atmospheres. The volume of fluid governed by the position of expansion piston 14 is referred to as expansion space 22.

The volume of fluid governed by the position of compression piston 12 is referred to as compression space 24. In order for fluid to flow between expansion space 22 and compression space 24, whether in the configuration shown or in another configuration of Stirling engine 10, the fluid passes through regenerator 26. Regenerator 26 is a matrix of material having a large ratio of surface area to volume which serves to absorb heat from the working fluid when the fluid enters hot from expansion space 22 and to heat the fluid when it passes from compression space 24 returning to expansion space 22.

During the first phase of the engine cycle, the starting condition of which is depicted in FIG. 1a, piston 12 compresses the fluid in compression space 24. The compression occurs at a constant temperature because heat is extracted from the fluid to the ambient environment. In practice, a cooler 68 (shown in FIG. 2) is provided, as will be discussed in the description below. The condition of engine 10 after compression is depicted in FIG. 1b. During the second phase of the cycle, expansion piston 14 moves in synchrony with compression piston 12 to maintain a constant volume of fluid. As the fluid is transferred to expansion space 22, it flows through regenerator 26 and acquires heat from regenerator 26 such that the pressure of the fluid increases. At the end of the transfer phase, the fluid is at a higher pressure and is contained within expansion space 22, as depicted in FIG. 1c.

During the third (expansion) phase of the engine cycle, the volume of expansion space 22 increases as heat is drawn in from outside engine 10, thereby converting heat to work. In practice, heat is provided to the fluid in expansion space 22 by means of a heater 64 (shown in FIG. 2) which is discussed in greater detail in the description below. At the end of the expansion phase, the hot fluid fills the full expansion space 22 as depicted in FIG. 1d. During the fourth phase of the engine cycle, the fluid is transferred from expansion space 22 to compression space 24, heating regenerator 26 as the fluid passes through it. At the end of the second transfer phase, the fluid is in compression space 24, as depicted in FIG. 1a, and is ready for a repetition of the compression phase. The Stirling cycle is depicted in a P-V (pressure-volume) diagram as shown in FIG. 1e and in a T-S (temperature -entropy) diagram as shown in FIG. 1f. The Stirling cycle is a closed cycle in that the working fluid is typically not replaced during the course of the cycle.

The principle of operation of a Stirling cycle refrigerator can also be described with reference to FIGS. 1a–1e, wherein identical numerals are used to identify the same or similar parts. The differences between the engine described above and a Stirling machine employed as a refrigerator are that compression volume 22 is typically in thermal communication with ambient temperature and expansion volume 24 is connected to an external cooling load (not shown). Refrigerator operation requires net work input.

Stirling cycle engines have not generally been used in practical applications, and Stirling cycle refrigerators have been limited to the specialty field of cryogenics, due to several daunting engineering challenges to their development. These involve such practical considerations as efficiency, vibration, lifetime, and cost. The instant invention addresses these considerations.

SUMMARY OF THE INVENTION

A method of combusting a fuel and air in a burner of an external combustion engine, the fuel and air combined to form a fuel-air mixture having a variable fuel-air ratio, the fuel-air mixture when combusted producing an exhaust gas product includes igniting the fuel-air mixture to form a flame at a first fuel-air ratio produced by a first air flow rate and a fuel flow rate, increasing the air flow rate to produce a second fuel-air ratio, controlling the fuel flow rate based at least on a temperature of the heater head, and maintaining the flame at the second fuel-air ratio by adjusting the air flow rate based at least on a temperature of the air and an oxygen concentration in the exhaust gas product. Igniting the fuel and air where the fuel having an auto-ignition temperature and a flame speed includes propelling the air at a speed above the flame speed into an inlet of a throat, the throat also having an outlet and a constant cross sectional area from inlet to outlet and mixing fuel into the air forming the fuel-air mixture, the fuel-air mixture exiting the outlet, such that a flame is created in the air fuel mixture outside the outlet of the throat.

In accordance with another embodiment of the invention, the second fuel-air ratio is maintained by adjusting the air flow rate based on an oxygen concentration in the exhaust gas. In a further embodiment, the second fuel-air ratio may be maintained by adjusting the air flow rate based at least on a temperature of the air and the fuel flow rate. In an alternative embodiment, the second fuel-air ratio is maintained by adjusting the air flow rate based at least on a temperature of the air and an oxygen concentration in the exhaust gas.

A system for operating a combustion chamber of an external combustion engine having a heater head, the combustion chamber characterized by a combustion axis and for delivering heat to the heater head of the engine by combusting a fuel in air to produce heat and an exhaust gas product includes a swirler having axial symmetry about the combustion axis of the combustion chamber for conveying inwardly flowing air, a fuel injector for injecting fuel into the radially inwardly flowing air in such a manner that the air and fuel mix to form an air-fuel mixture having a specified air-fuel ratio and a fuel supply regulator for delivering fuel at a specified rate of fuel delivery. The system further includes a blower for delivering air to the burner at a specified air flow rate so as to produce the specified air-fuel ratio, a swirler air temperature sensor for measuring the temperature of the air delivered to the combustion chamber, and a controller for governing the rate of air delivery based at least on the temperature of the air delivered to the combustion chamber.

In a further embodiment, the system includes a heater head temperature sensor for measuring the temperature of the heater head and a controller for governing the rate of fuel delivery based at least upon the temperature of the heater head and the temperature of the air delivered to the combustion chamber. In yet another embodiment, the system further includes a gas composition sensor for monitoring a gas concentration in the exhaust product of the burner and a controller for governing the rate air delivery based at least upon the temperature of the air delivered to the combustion chamber and the gas composition in the exhaust gas product. The system may also include a flow sensor for measuring the rate of fuel delivery where the controller includes a controller based at least on he temperature of the air delivered to the combustion chamber and the measured rate of fuel delivery.

BRIEF DESCRIPTION OF THE DRAWINGS

The invention will be more readily understood by reference to the following description, taken with the accompanying drawings, in which:

FIGS. 1a–1e depict the principle of operation of a prior art Stirling cycle machine;

FIG. 5b is a magnified perspective detail view of the pin heat exchanger of FIG. 5a;

FIG. 6b is a planar view of the system of branching ducts of FIG. 9a;

DETAILED DESCRIPTION OF PREFERRED EMBODIMENTS

Figure 2:
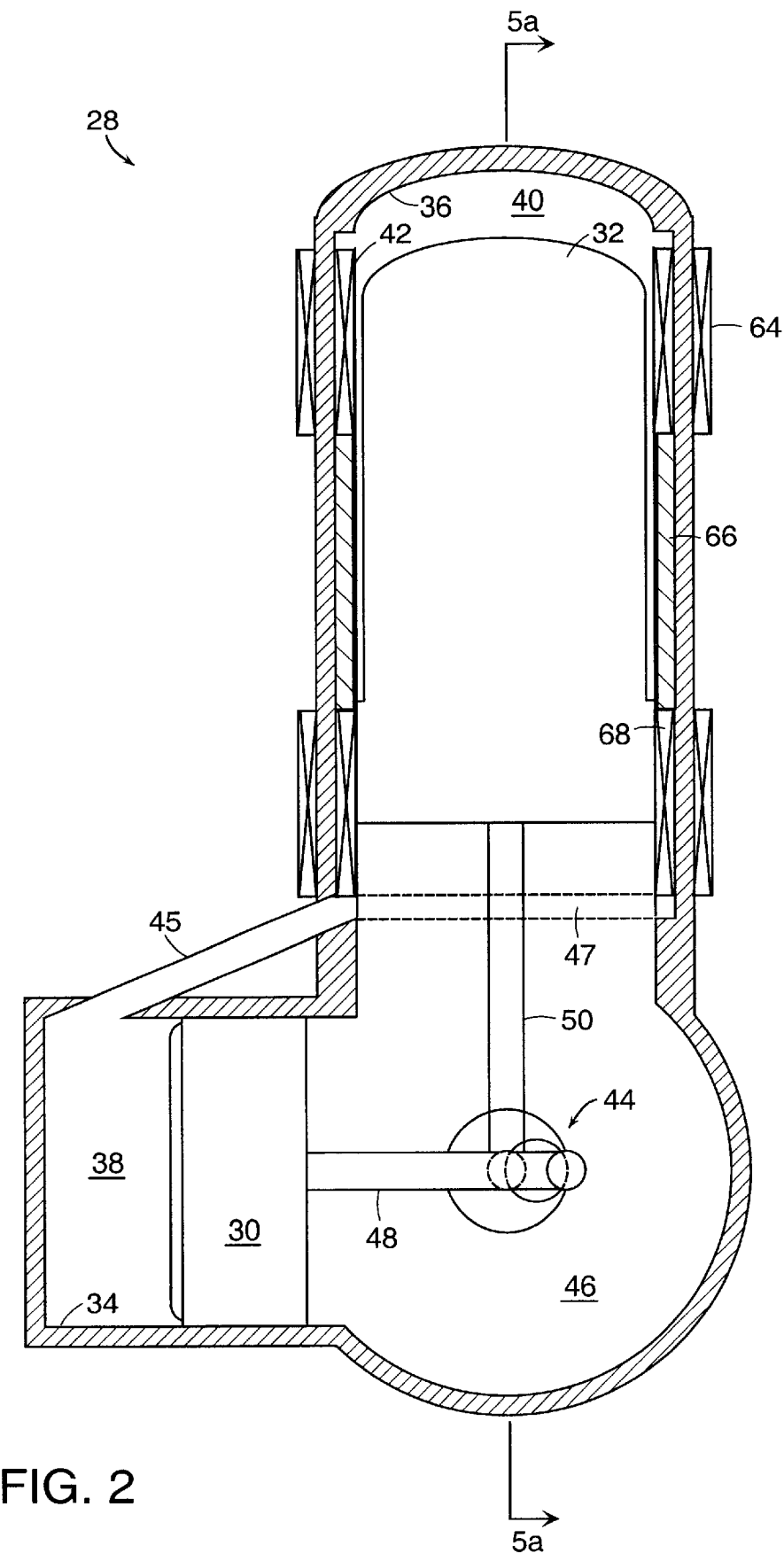
FIG. 2 is a side view in cross section of a Stirling cycle engine in accordance with an embodiment of the present invention.

Referring now to FIG. 2, one embodiment of a Stirling cycle engine is shown in cross-section and is designated generally by numeral 28. While the invention will be described generally with reference to the Stirling engine shown in FIG. 2, it is to be understood that many engines as well as refrigerators may similarly benefit from various embodiments and improvements which are subjects of the present invention. The configuration of Stirling engine 28 shown in FIG. 2 is referred to as an alpha configuration, characterized in that compression piston 30 and expansion piston 32 undergo linear motion within respective and distinct cylinders: compression piston 30 in compression cylinder 34 and expansion piston 32 in expansion cylinder 36. The alpha configuration is discussed by way of example only, and without limitation of the scope of any appended claims.

In addition to compression piston 30 and expansion piston 32, the main components of Stirling engine 28 include heater 64, regenerator 66, and cooler 68. Compression piston 30 and expansion piston 32, referred to collectively as pistons, are constrained to move in reciprocating linear motion within respective volumes 38 and 40. A cylinder liner 42 may line the respective cylinder surfaces. The volumes of the cylinder interior proximate to the heater 64 and cooler 68 will be referred to, herein, as hot and cold sections, respectively, of engine 28. The relative phase (the "phase angle") of the reciprocating linear motion of compression piston 30 and expansion piston 32 is governed by their respective coupling to drive mechanism 44 housed in crankcase 46. Drive mechanism 44, discussed in greater detail below, may be employed to govern the relative timing of pistons and to interconvert linear and rotary motion. Compression piston 30 and expansion piston 32 are coupled, respectively, to drive mechanism 44 via a first connecting rod 48 and a second connecting rod 50. The volume 38 of compression cylinder 34 is coupled to cooler 68 via duct 45 to allow cyclic cooling of working fluid. Duct 45, more particularly, couples compression volume 38 to the annular heat exchangers comprising cooler 68, regenerator 66, and heater 64. Branching of flow between duct 45 and annular plenum 47 is discussed below with reference to FIG. 6.

Figure 3:
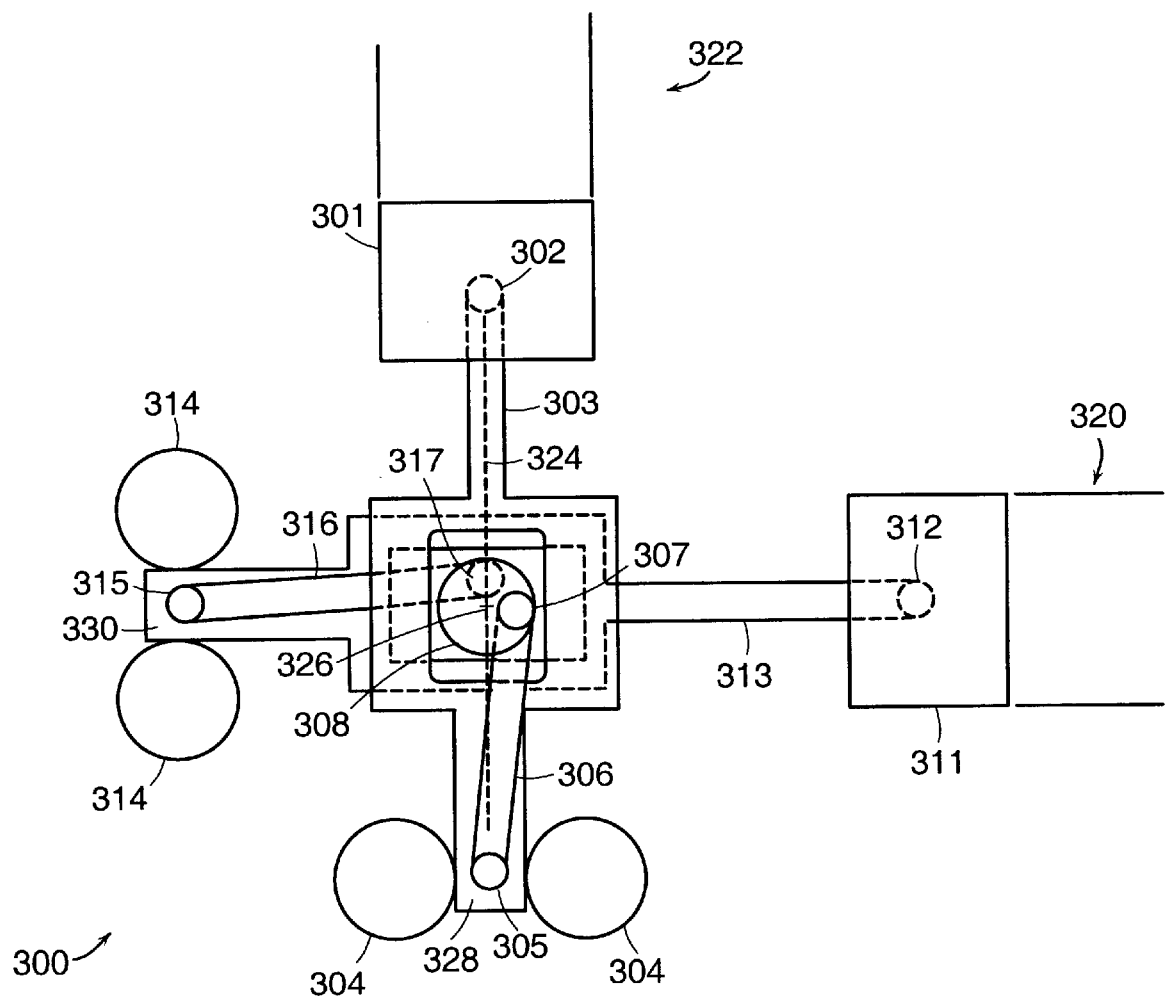
FIG. 3 is a cross-sectional view of a folded guide link drive mechanism for a two-piston machine such as a Stirling cycle machine in accordance with a preferred embodiment of the invention.

The operation of drive mechanism 44 is now discussed with reference to FIGS. 3 and 4. FIG. 3 is a cross-sectional view of a dual folded guide link drive mechanism designated generally by numeral 300. For a more detailed discussion of a preferred folded guide link drive, see pending U.S. patent application Ser. No. 09/335,392, filed Jun. 17, 1999, entitled "Folded Guide Link Stirling Engine", which is incorporated herein by reference. The drive mechanism 300 in FIG. 3 comprises two folded guide links 303 and 313. Pistons 301 and 311 are the displacer and compression pistons, respectively, of a Stirling cycle engine such as described above with respect to FIG. 2. As used in this description and the following claims, a displacer piston is either a piston without a seal or a piston with a seal (commonly known as an "expansion" piston). Displacer piston 301 is rigidly coupled to the piston end of guide link 303 at a piston connection point 302. Guide link 303 is rotatably connected to a connecting rod 306 at a rod connection point 305. The piston connection point 302 and the rod connection point 305 define the longitudinal axis 324 of guide link 303.

Connecting rod 306 is rotatably connected to a crankshaft 308 at a crankshaft connection point 307 which is offset a fixed distance from the crankshaft axis of rotation 326. The crankshaft axis of rotation 326 is orthogonal to the longitudinal axis 324 of the guide link 303 and the crankshaft axis of rotation 326 is disposed between the rod connection point 305 and the piston connection point 302. In a preferred embodiment, the crankshaft axis of rotation 326 intersects the longitudinal axis 324.

An end 328 of guide link 303 is constrained between a pair of rollers 304. In a preferred embodiment, one of the rollers 304 is spring loaded to maintain rolling contact with the guide link 303. Alignment of the longitudinal axis 324 of the guide link 303 with respect to piston cylinder 322 is maintained by the rollers 304 and by the piston 301. As crankshaft 308 rotates about the crankshaft axis of rotation 326, the rod connection point 305 traces a linear path along the longitudinal axis 324 of the guide link 303.

Piston 301 and guide link 303 form a lever with the piston 301 at one end of the lever and the rod end 328 of the guide link 303 at the other end of the lever. The fulcrum of the lever is on the line defined by the centers of the rollers 304. The lever is loaded by a force applied at the rod connection point 305. As rod connection point 305 traces a path along the longitudinal axis of the guide link 303, the distance between the rod connection point 305 and the fulcrum, the first lever arm, will vary from zero to one-half the stroke distance of the piston 301. The second lever arm is the distance from the fulcrum to the piston 301. The lever ratio of the second lever arm to the first lever arm will always be greater than one, preferably in the range from 5 to 15. The lateral force at the piston 301 will be the forced applied at the rod connection point 305 scaled by the lever ratio; the larger the lever ratio, the smaller the lateral force at the piston 301.

The compression piston 311 is rigidly coupled to the piston end of guide link 313 at a piston connection point 312. Guide link 313 is rotatably connected to a connecting rod 316 at a rod connection point 315. The piston connection point 312 and the rod connection point 315 define the longitudinal axis of guide link 313. Connecting rod 316 is rotatably connected to the crankshaft 308 at a crankshaft connection point 317 which is offset a fixed distance from the crankshaft axis of rotation 326. An end 330 of guide link 313 is constrained between a pair of rollers 314. As discussed above, in a preferred embodiment on of the rollers 314 is spring loaded to maintain rolling contact with the guide link 313. The operation of guide link 313 is similar to that described above with respect to guide link 303. Alignment of the longitudinal axis of guide link 313 with respect to piston cylinder 320 is maintained by the rollers 314 and by the piston 301. As crankshaft 308 rotates about the crankshaft axis of rotation 326, the rod connection point 305 traces a linear path along the longitudinal axis of the guide link 313.

Figure 4:
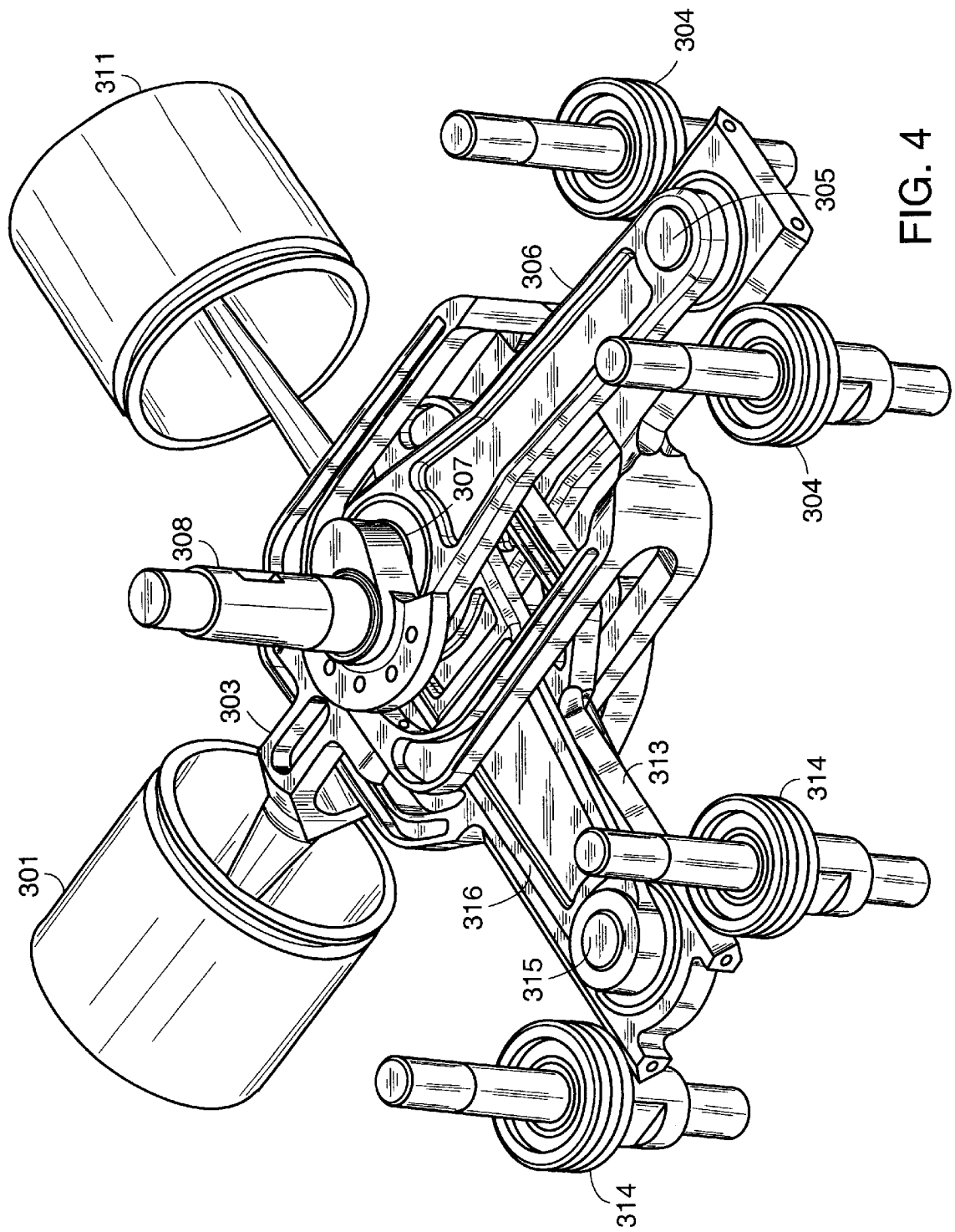
FIG. 4 is a perspective view of one embodiment of the folded guide link drive mechanism of FIG. 3.

FIG. 4 is a perspective view of the dual folded guide link drive mechanism shown in FIG. 3. Compression piston 311 and displacer piston 301 undergo linear motion within respective and distinct cylinders: compression piston 311 in compression cylinder 320 and displacer piston 301 in expansion cylinder 322. Guide link 303 and guide link 313 are rigidly coupled to displacer piston 301 and compression piston 311 at piston connection points 302 and 312 respectively (shown in FIG. 3). Connecting rods 306 and 316 are rotationally coupled at connection points 305 and 315 of the distal ends of guide links 303 and 313 to crankshaft 308 at crankshaft connection points 307 and 317 (shown in FIG. 3). Lateral loads on guide links 303 and 313 are taken up by roller pairs 304 and 314.

Figure 5A:
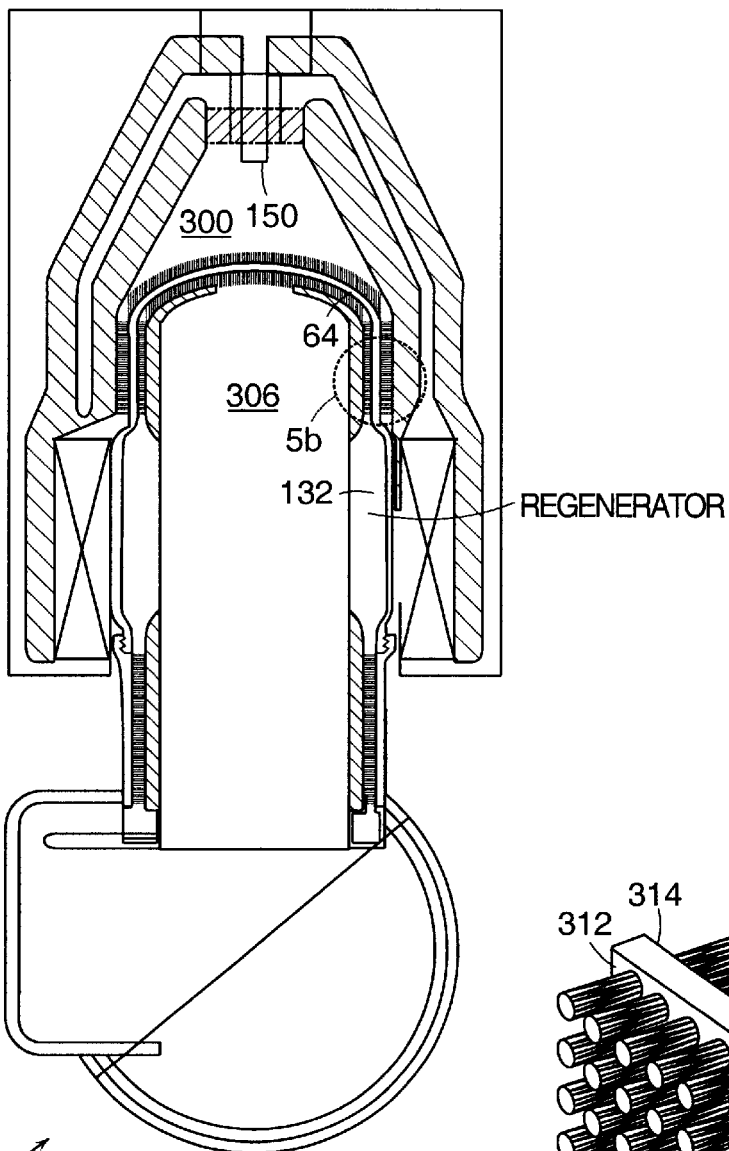
FIG. 5a is a cross-sectional view of a Stirling cycle engine employing a pin heat exchanger, in accordance with an embodiment of the present invention.
Figure 5B:
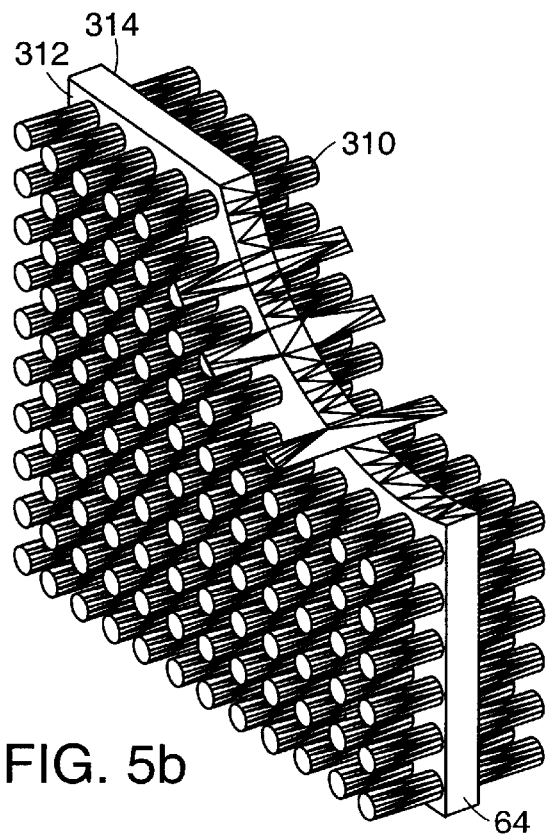
Figure 5C:
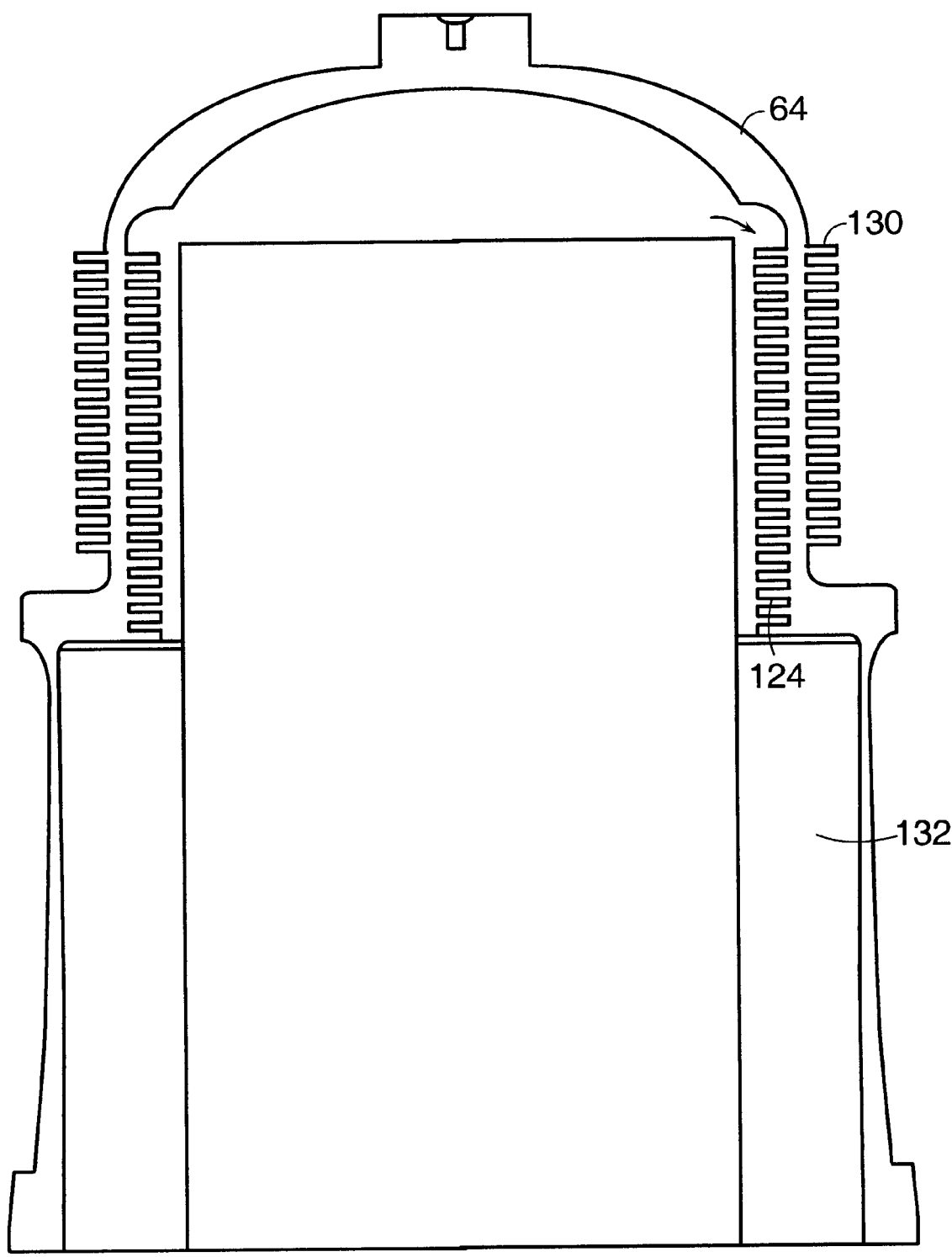
FIG. 5c shows a cross-sectional view of the heater head assembly of FIG. 5a with heat transfer pins shown schematically, not to scale, in accordance with a preferred embodiment of the invention.

Referring now to FIGS. 5a–5c, a novel structure is depicted, in accordance with an embodiment of the present invention, for transferring large amounts of heat from the combustion source to the interior of Stirling cycle engine 28, shown in cross section. In order to increase the efficiency of heat transfer from hot gases 300, generated by burner 150, to the working fluid contained in the interior volume 306 of the engine, a large wetted surface area, on either side of heater head 64 is required. To achieve the high surface area, a large number of metal pins 310 are fabricated on either one of or both the interior surface 312 and exterior surface 314 of heater head 64. Fabrication may be accomplished at low cost, such as by investment casting. Metal pins 310 not only increase the wetted surface area on either side of heater head 64 but also create turbulent wakes that increase fluid mixing and thereby further increase the flow of heat. This structure may also be employed for heat transfer at the cooler 68 (shown in FIG. 2) or in any application where efficient heat transfer is required between volumes of gases. FIG. 5c shows a cross-sectional view of the heater head assembly of FIG. 5a with het transfer pins 130 and 124 shown schematically in accordance with a preferred embodiment of the invention. In FIG. 5c, inner heat transfer pins 124 and outer heat transfer pins 130 are located along the sides of the heater head 64. The use and method of manufacture of heat transfer pins is described in copending U.S. patent application Ser. No. 09/115,381, filed Jul. 14, 1998 and copending U.S. patent application Ser. No. 09/517,245, filed Mar. 2, 2000, titled "Stirling Engine Thermal System Improvements," which are herein incorporated by reference.

Figure 6B:
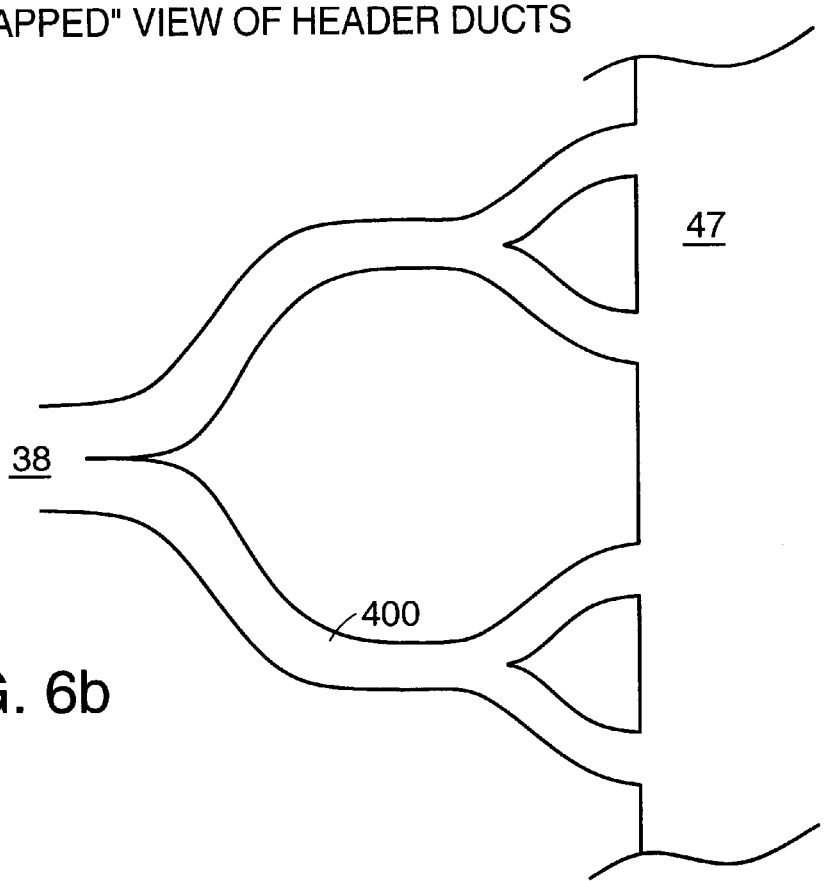
Figure 6A:
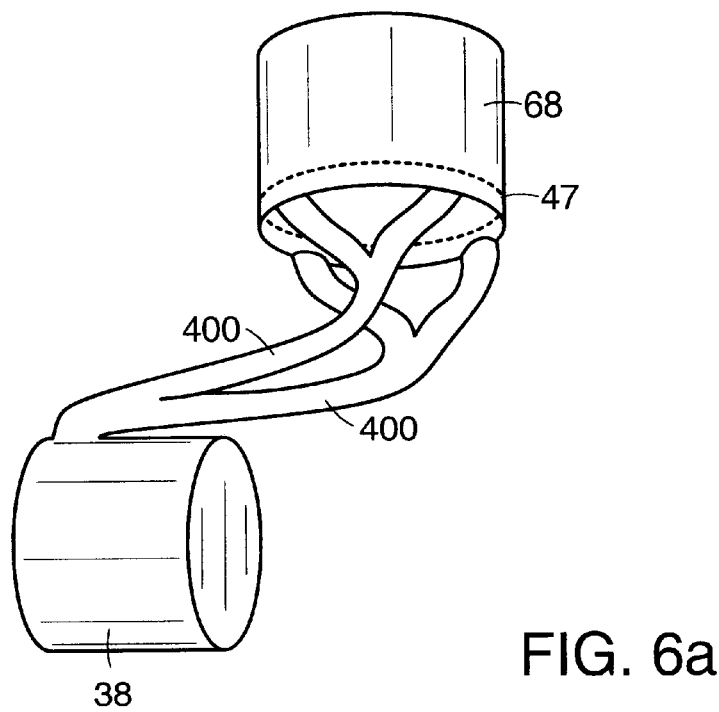
FIG. 6a is a perspective view from the bottom of the Stirling cycle engine of FIG. 2, showing branching ducts for enhancing flow uniformity in accordance with an embodiment of the present invention.

Referring to FIG. 6a, a perspective view is shown of a system of header ducts 400 providing for the flow of working fluid between compression volume 38 and the annular region of fluid flow through the heat exchange network, namely past cooler head 68, through regenerator 66 (shown in FIG. 2), and past heater head 64 (shown in FIG. 2). The annular flow of working fluid culminates at annular header 47 to which branching ducts 400 are coupled for creating equal-length flow passages between cylinder volume 38 and the entire annular region of header 47. By substantially equalizing the flow impedance between every portion of the annular flow region and the cylinder volume, losses due to flow non-uniformities through the heat exchangers may be advantageously reduced, and, additionally, the flow of working fluid within a loop confined to the heat exchange region and thereby lost for purposes of mechanical work may be minimized. FIG. 6b shows a schematic of the system of branching ducts 400 of FIG. 6a, "unwrapped" into a planar view, showing the fluid communication via branching ducts 400 between compression space 38 and annular header 47.

Figure 8:
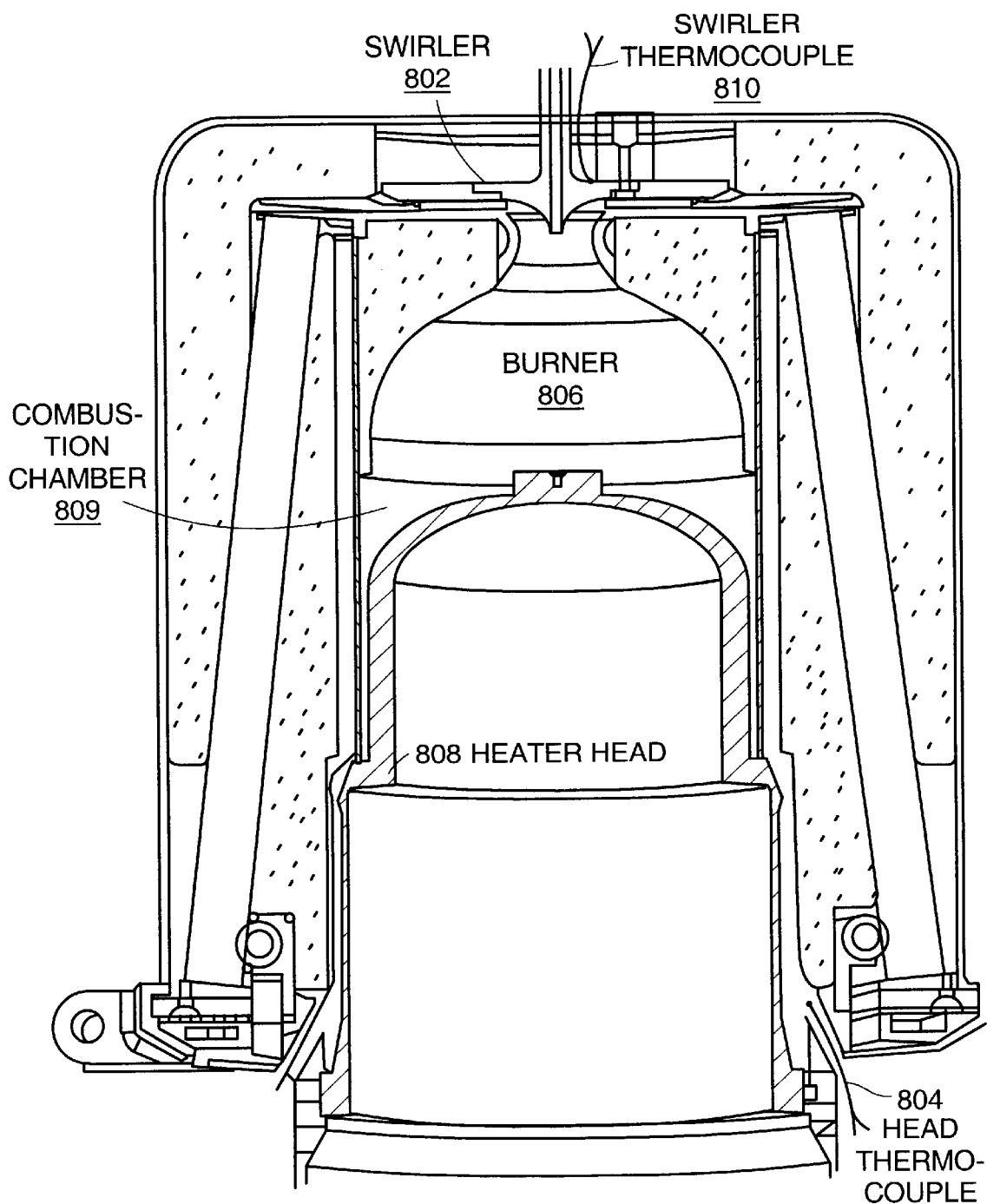
FIG. 8 is a cross section of a burner and heater head assembly showing the placement of temperature sensors in accordance with an embodiment of the invention.

While Stirling engines are capable of providing high thermal efficiency and low emission of pollutants, these objectives impose requirements of thermal efficiency, in particular, on a burner 806 employed to heat heater head 808 of the Stirling engine as shown in FIG. 8. Components of such thermal efficiency include the efficient pumping of oxidant (typically, air, and, referred to herein and in any appended claims, without limitation, as "air") through the burner 806 to provide combustion, and the recovery of hot exhaust leaving the heater head 808. In many applications, air (or other oxidant) is pre-heated, prior to combustion, nearly to the temperature of the heater head 808, so as to achieve the stated objectives of thermal efficiency. There is still a considerable amount of energy left in the combustion gases after the heater head of the Stirling engine has been heated, and, as known to persons skilled in the art, a heat exchanger may be used to transfer heat from the exhaust gases to the combustion air prior to introduction into the burner. In order to achieve high efficiency and low emissions, the burner must provide substantially complete combustion. In order to achieve substantially complete combustion, a measured amount of air as well as a clean burning fuel, preferably propane, are delivered to the burner. The fuel and air flow rates are controlled in order to allow for ignition of a flame in the burner as well as for clean emissions after ignition. The fuel and air must also be well-mixed with sufficient amounts of oxygen to limit the emission of carbon monoxide (CO) and hydrocarbons and, additionally, must be burned at low enough flame temperatures to limit the formation of oxides of nitrogen ($NO_x$).

The high temperature of preheated air, desirable for achieving high thermal efficiency, complicates achieving low-emission goals by making it difficult to premix the fuel and air and requiring large amounts of excess air in order to limit the flame temperature. As used herein and in any appended claims, the term "auto-ignition temperature" is defined as the temperature at which a fuel will ignite without a temperature-decreasing catalyst under existing conditions of air and fuel pressure. The typical preheated air temperature exceeds the auto-ignition temperature of most fuels, potentially causing the fuel-air mixture to ignite before entering the combustion chamber. One solution to this problem is to use a non-premixed diffusion flame. However, since such diffusion flames are not well-mixed, higher than desirable emissions of CO, HC and $NO_x$ result. A detailed discussion of flame dynamics is provided by Turns, *An Introduction to Combustion: Concepts and Applications*, (McGraw-Hill, 1996), which is incorporated herein by reference. Any increased air flow provided to limit flame temperatures typically increases the power consumed by an air pump or blower, thereby degrading overall engine efficiency.

In accordance with the present invention, low emissions and high efficiency may be provided by producing a premixed flame even in the presence of air heated above the auto-ignition temperature of the fuel, and, additionally, by minimizing the pressure drop between the air inlet and the flame region, thereby minimizing blower power consumption.

The term "flame speed" is defined as the speed at which a flame front will propagate through a particular fuel-air mixture. Within the specification and the following claims, the term "combustion axis" shall refer to the direction of predominant fluid flow upon combustion of the fluid.

Figure 7A:
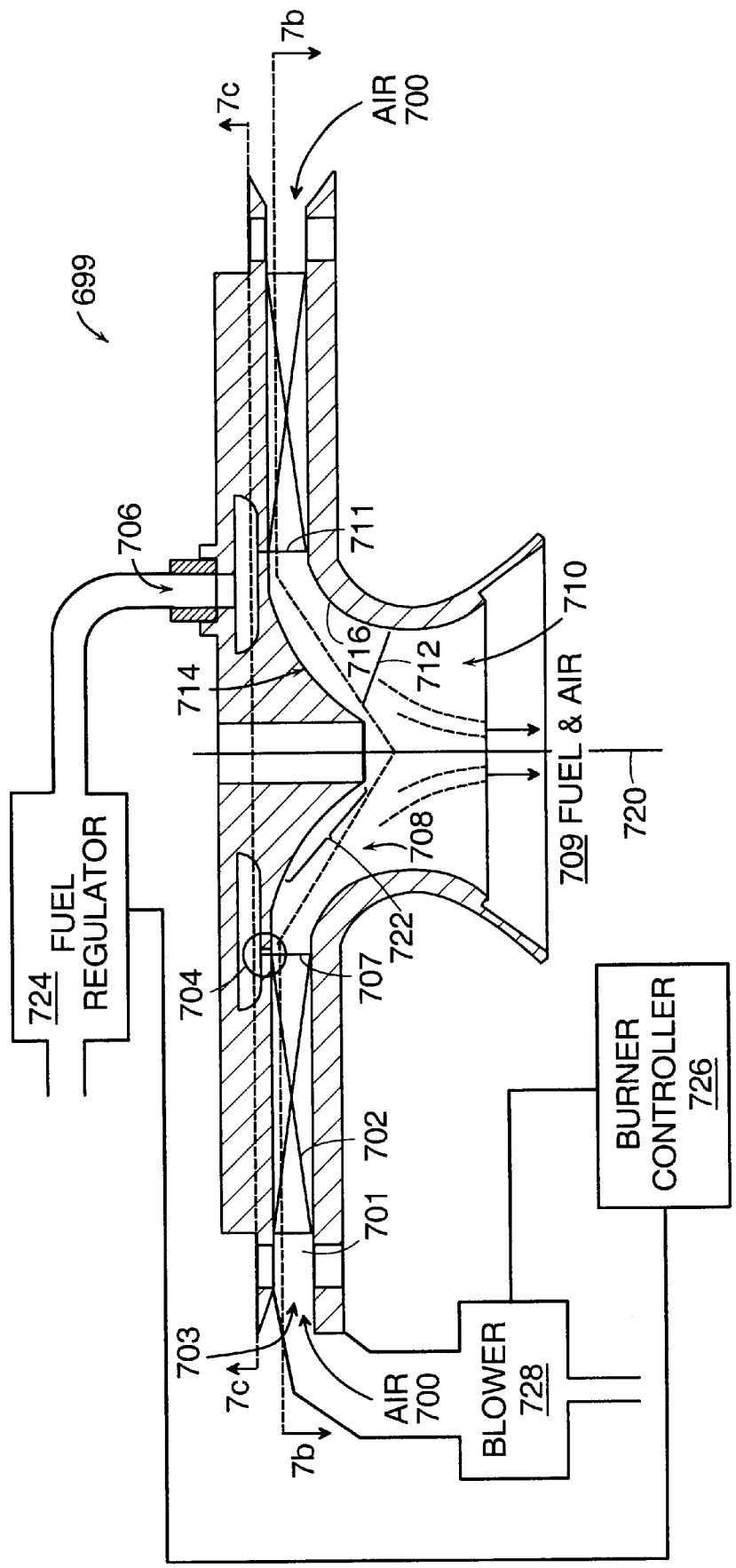
FIG. 7a shows a cross-sectional view from the side of a fuel intake manifold for a Stirling cycle engine in accordance with a preferred embodiment of the invention.
Figure 7B:
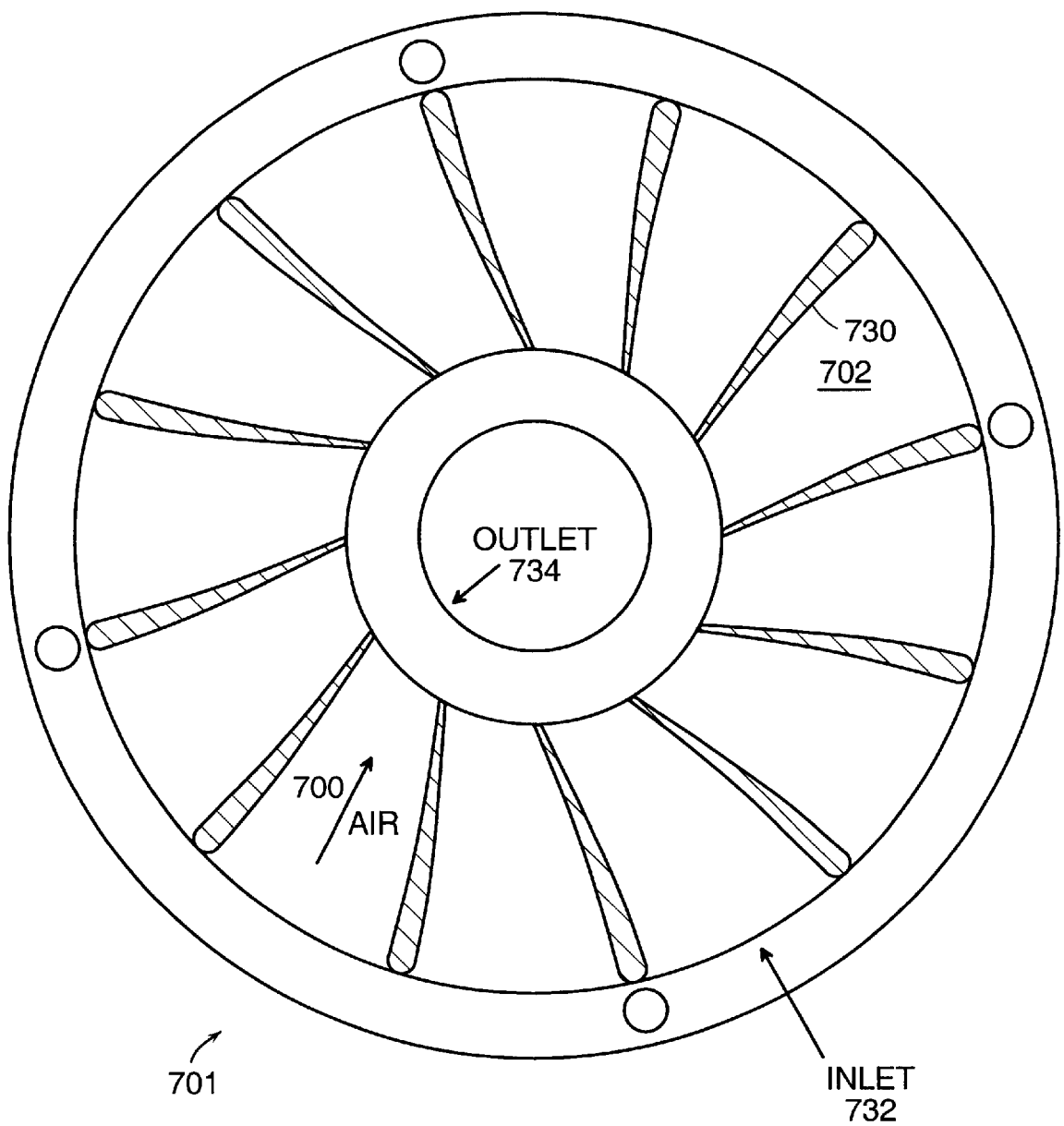
FIG.7b shows a cross sectional view from the top of the fuel intake manifold of FIG. 10a taken through cut BB.
Figure 7C:
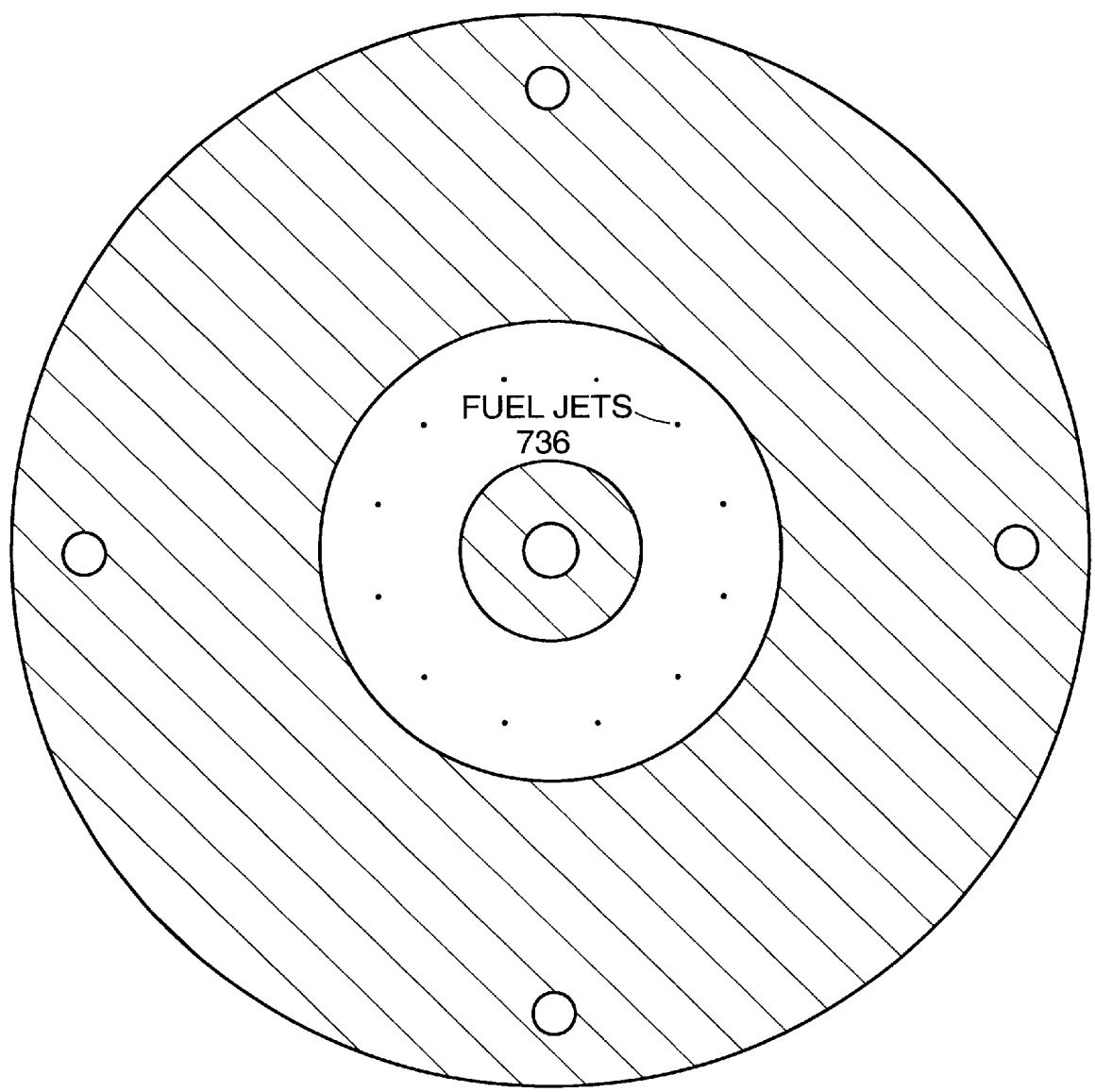
FIG.7c is a cross sectional view from the top of the fuel intake manifold of FIG. 10a taken through cut AA, showing the fuel jet nozzles.

Referring now to FIGS. 7a–7c, an intake manifold 699 is shown for application to a Stirling cycle engine or other combustion application in accordance with an embodiment of the present invention. In accordance with a preferred embodiment of the invention, fuel is pre-mixed with air that may be heated above the fuel's auto-ignition temperature and a flame is prevented from forming until the fuel and air are well-mixed and in the combustion chamber 809 (shown in FIG. 8. FIG. 7a shows a preferred embodiment of the apparatus including an intake manifold 699 and a combustion chamber 710. The intake manifold 699 has an axisymmetrical conduit 701 with an inlet manifold 703 for receiving air 700 supplied via the blower 728. Air 700 is preheated to a temperature, typically above 1000 K, which may be above the auto-ignition temperature of the fuel. Conduit 701 conveys air 700 flowing inward radially with respect to combustion axis 720 to a swirler 702 disposed within the conduit 701.

FIG. 7b shows a cross sectional view of the conduit 701 including swirler 702 in accordance with an embodiment of the invention. In the embodiment of FIG. 7b, swirler 702 has several spiral-shaped vanes 730 for directing the flow of air 700 radially inward and imparting a rotational component on the air. The diameter of the swirler section of the conduit decreases from the inlet 732 to the outlet 734 of swirler 702 as defined by the length of swirler vanes 730. The decrease in diameter of swirler vanes 730 increases the flow rate of air 700 in substantially inverse proportion to the diameter. The flow rate is increased so that it is above the flame speed of the fuel. At outlet 734 of swirler 702, fuel 706, which in a preferred embodiment is propane, is injected into the inwardly flowing air.

In a preferred embodiment, fuel 706 is injected by fuel injector 704 through a series of nozzles 736 as shown in FIG. 7c. More particularly, FIG. 7c shows a cross sectional view of conduit 701 and includes the fuel jet nozzles 736. Each of the nozzles 736 is positioned at the exit of the swirler vanes 730 and is centralized between two adjacent vanes. Nozzles 736 are positioned in this way for increasing the efficiency of mixing the air and fuel. The fuel jet nozzles 736 are sized to provide jets of fuel that extend at least half way across the conduit 701 (shown in FIGS. 7a and 7b). Calculations to size the fuel jet nozzles 736 are well known in the art and described in Boer and Chigier, "Combustion Aerodynamics," John Wiley & Sons, 1972. Nozzles 736 simultaneously inject the fuel 706 across the air flow 700. Since the air flow is faster than the flame speed, a flame will not form at that point even though the temperature of the air and fuel mixture is above the fuel's auto-ignition temperature. In a preferred embodiment, where propane is used, the preheat temperature, as governed by the temperature of the heater head, is approximately 900 K.

Referring again to FIG. 7*a*, the air and fuel, now mixed, referred to hereafter as "air-fuel mixture" 709, is transitioned in direction through a throat 708 which has a contoured fairing 722 and is attached to the outlet 707 of the conduit 701. Fuel 706 is supplied via fuel regulator 724. Throat 708 has an inner radius 714 and an outer dimension 716. The transition of the air-fuel mixture is from a direction which is substantially transverse and radially inward with respect to combustion axis 720 to a direction which is substantially parallel to the combustion axis. The contour of the fairing 722 of throat 708 has the shape of an inverted bell such that the cross sectional area of throat 708 with respect to the combustion axis remains constant from the inlet 711 of the throat to outlet 712 of the throat. The contour is smooth without steps and maintains the flow speed from the outlet of the swirler to the outlet of the throat 708 to avoid separation and the resulting recirculation along any of the surfaces. The constant cross sectional area allows the air and fuel to continue to mix without decreasing the flow speed and causing a pressure drop. A smooth and constant cross section produces an efficient swirler, where swirler efficiency refers to the fraction of static pressure drop across the swirler that is converted to swirling flow dynamic pressure. Swirl efficiencies of better than 80% may typically be achieved by practice of the invention. Thus, the parasitic power drain of the combustion air fan may be minimized.

Outlet 712 of the throat flares outward allowing the air-fuel mixture 709 to disperse into the chamber 710 slowing the air-fuel mixture 709 thereby localizing and containing the flame and causing a toroidal flame to form. The rotational momentum generated by the swirler 602 produces a flame stabilizing ring vortex as well known in the art.

As discussed above, the fuel and air flow rates are controlled in order to allow for ignition of a flame in the burner as well as for clean emissions after ignition. Referring to FIG. 7*a*, burner controller 726 is used to control the fuel and air flow rates provided by fuel regulator 724 and blower 728 respectively. The fuel regulator 724 is set to an initial value for ignition. Once the flame is proved, the burner controller 726 varies the fuel flow rate to control the heater head temperature as measured by a head temperature sensor 804 (shown in FIG. 8). A flame is proved when a flame detector detects the presence of the flame. There are several types of flame detectors including thermocouples and ultraviolet sensors known in the art. Flame detection methods are discussed in copending U.S. patent application Ser. No. 09/517,808, filed Mar. 2, 2000, which is herein incorporated by reference.

The output (or air mass flow rate) of the combustion air blower 728 is set by the burner controller 726 to control the fuel-air ratio in the combustion chamber 809 (shown in FIG. 8). The fuel-air ratio is the ratio of the fuel mass flow rate over the air mass flow rate and is the primary factor affecting emissions. The blower 728 controls the fuel-air ratio by increasing or decreasing the air mass flow rate relative to the fuel mass flow rate. For example, in order to hold the fuel-air ratio constant, the burner controller 726 will increase the blower output as the fuel regulator 724 increases its output and vice versa. The desired fuel-air ratio and the fuel flow rate may be changing at the same time, so the burner controller 726 will change the output of the blower 728 to accommodate both the change in desired fuel-air ratio and the fuel flow rate.

Minimizing the emissions of carbon monoxide (CO), hydrocarbons (HC) and oxides of nitrogen ($N_{ox}$) requires a lean fuel-air mixture which still achieves complete combustion. A lean fuel-air mixture has more air than a stoichiometric mixture (i.e., 15.67 grams of air per gram of propane, for example). As more air is added to a fixed amount of fuel, the emissions of CO, HC and $NO_x$ will decrease until the amount of air in the fuel-air mixture is large enough that the flame becomes unstable. At this point, pockets of the fuel-air mixture will pass through the burner without complete combustion. Incomplete combustion of the fuel-air mixture produces large amounts of CO and HC. The CO and HC emissions will quickly increase as more air is added to the fuel-air mixture until the flame extinguishes at a Lean Blow-Out limit ("LBO"). The LBO will increase as the temperature of the incoming air (i.e, the preheated air) increases. As a result, the optimal fuel-air ratio of the fuel-air mixture decreases as the temperature of the preheated air increases during the warmup phase of the Stirling engine. Once the engine is warmed up, the fuel-air ratio is held constant.

Accordingly, the fuel-air ratio must first be controlled to provided the optimal fuel-air ratio for ignition. Once the flame is proved, the fuel-air ratio is controlled to minimize emissions based upon the temperature of the preheated air and the fuel type. When the fuel flow rate is increased or decreased to adjust the temperature of the heater head, the air flow rate is also adjusted to maintain the desired fuel-air ratio.

A given fuel will only ignite over a limited range of fuel-air ratios. At ignition, an ignition fuel-air ratio is chosen which is equal to or less than the stoichiometric fuel-air ratio corresponding to the fuel being used. In a preferred embodiment, where the fuel is propane, the ignition fuel-air ratio is set to 0.1 grams propane per gram of air. The ignition fuel-air ratio is maintained until the flame stabilizes and temperature of the interior of the combustion chamber increases to a warmup temperature. Referring to FIG. 8, the temperature of the combustion chamber 809 is typically determined by measuring the temperature of the heater head 808 or by allowing a predetermined time interval for the combustion chamber to heat. A temperature sensor, such as thermocouple 804, may be used to measure the temperature of heater head 808. In a preferred embodiment, the ignition fuel-air ratio is held until the heater head temperature reaches 300° C. and the flame has been lit for 5 seconds.

Figure 9:
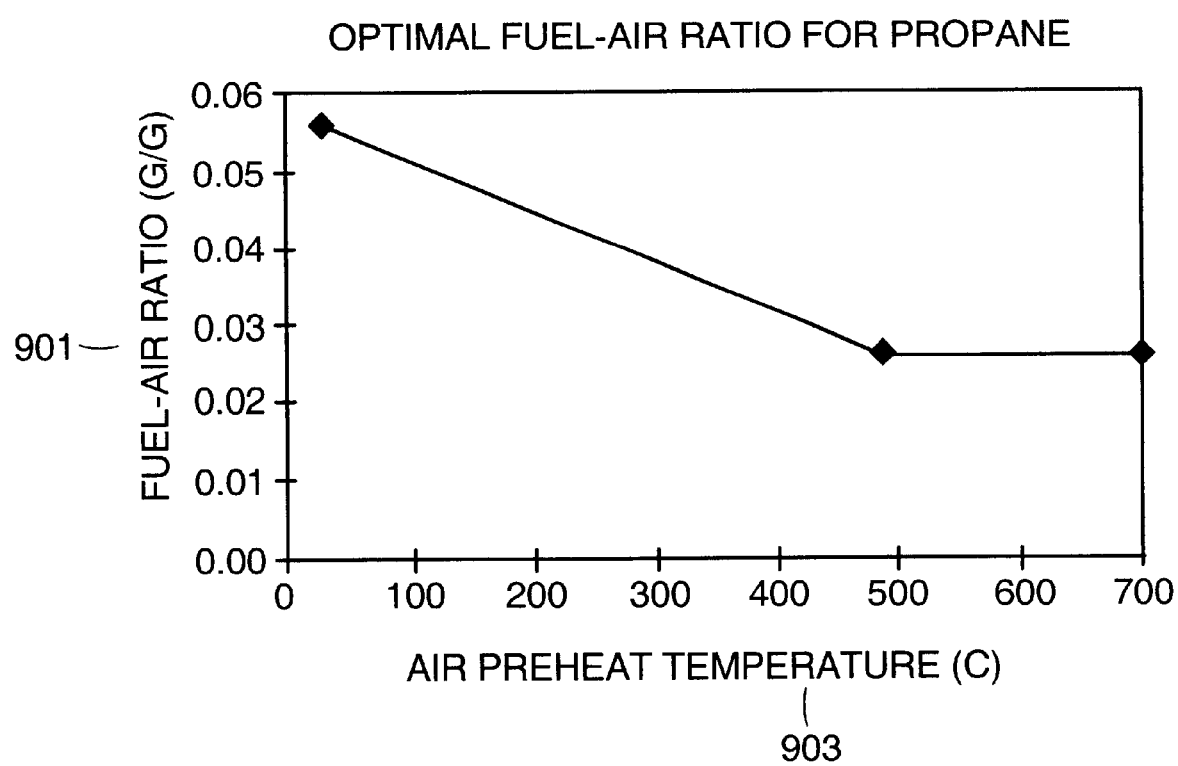
FIG. 9 shows the relationship of the optimal fuel-air ratio to the air preheat temperature for propane in accordance with a preferred embodiment of the invention.

Once the flame is stabilized, and the temperature of the combustion chamber 809 reaches the desired warmup temperature, the fuel-air ratio is then controlled based upon the air preheat temperature and the fuel type. As described above, the optimal fuel-air ratio 901 of the fuel-air mixture decreases as the temperature of the preheated air 903 increases as shown in FIG. 9. The temperature of the preheated air is measured using a temperature sensor, such as a thermocouple 810, in an air swirler 802 coupled to the combustion chamber 806 as shown in FIG. 8. The air preheat temperature can also be inferred from the heater head 808 temperature by subtracting several hundred degrees Celsius from the heater head temperature. In a preferred embodiment, the air preheat temperature is taken as the heater head temperature minus 300° C.

The optimal fuel-air ratio will first decrease linearly with the preheated air temperature from a "start" fuel-air ratio for room temperature air to a "run" fuel air ratio, for a warmed up preheated air temperature. The air is considered fully warmed up when it exceeds the known auto-ignition temperature for the fuel. For example, the auto-ignition temperature for propane is 490° C. In a preferred embodiment, where the fuel is propane, the "start" fuel-air ratio is 0.052 grams of fuel to grams of air, which results in approximately 4% oxygen in the exhaust of the Stirling engine. The "run" fuel-air ratio in the preferred embodiment, is 0.026 grams of fuel to grams of air, which results in approximately 13% oxygen in the exhaust of the Stirling engine.

The fuel-air ratio may be determined by measuring the air and fuel flow rates. A pressure sensor may be used to measure the air-flow rate at the blower 728 (shown in FIG. 7*a*). The fuel flow rate may be determined by measuring the pressure upstream and downstream of a set of fuel control valves of fuel regulator 724 (shown in FIG. 7*a*) and by monitoring which of the valves is currently open. In an alternative embodiment, the fuel-air ratio may be based on a measurement of the oxygen content in the exhaust of the Stirling engine. An oxygen sensor may be placed in the engine to sample the exhaust gas and measure the percentage of oxygen in the exhaust of the engine.

The devices and methods described herein may be applied in other applications besides the Stirling engine in terms of which the invention has been described. The described embodiments of the invention are intended to be merely exemplary and numerous variations and modifications will be apparent to those skilled in the art. All such variations and modifications are intended to be within the scope of the present invention as defined in the appended claims.

We claim:

1. A method of combusting a fuel and air in a burner of an external combustion engine having a heater head, the fuel and air combined to form a fuel-air mixture characterized by a fuel-air ratio, the fuel-air mixture when combusted producing an exhaust gas product, the method comprising:

igniting the fuel-air mixture to form a flame at a first fuel-air ratio produced by a first air flow rate and a fuel flow rate;

increasing the air flow rate to produce a second fuel-air ratio;

controlling the fuel flow rate based at least on a temperature of the heater head; and maintaining the flame at the second fuel-air ratio by adjusting the air flow rate based at least on the fuel flow rate.

2. A method according to claim 1, wherein the second fuel-air ratio is maintained by adjusting the air flow rate based at least on an oxygen concentration in the exhaust gas.

3. A method according to claim 1, wherein the second fuel-air ratio is maintained by adjusting the air flow rate based at least on the fuel flow rate and a temperature of the air.

4. A method according to claim 1, wherein the second fuel-air ratio is maintained by adjusting the air flow rate based at least on the temperature of the air and an oxygen concentration in the exhaust gas.

5. A method according to claim 1, wherein igniting the fuel and air, the fuel having an auto-ignition temperature and a flame speed includes propelling the air at a speed above the flame speed into an inlet of a throat, the throat also having an outlet and a constant cross sectional area from inlet to outlet and mixing fuel into the air forming the fuel-air mixture, the fuel-air mixture exiting the outlet, such that a flame is created in the air fuel mixture outside the outlet of the throat.

6. A method according to claim 1, wherein the fuel has an auto-ignition temperature and the fuel-air mixture is ignited at a first air temperature which is less than or equal to the auto-ignition temperature of the fuel.

7. A method according to claim 1, wherein the fuel has an auto-ignition temperature and the flame is maintained at a second air temperature which is greater than the auto-ignition temperature of the fuel.

8. A system for operating a combustion chamber of a thermal cycle engine having a heater head, the combustion chamber characterized by a combustion axis and for delivering heat to the heater head of the engine by combusting a fuel in air to produce heat and an exhaust gas product, the system comprising:

a swirler having axial symmetry about the combustion axis of the combustion chamber for conveying inwardly flowing air;

a fuel injector for injecting fuel into the radially inwardly flowing air in such a manner that the air and fuel mix to form an air-fuel mixture having a specified air-fuel ratio;

a fuel supply regulator for delivering fuel at a specified rate of fuel delivery;

a blower for delivering air to the burner at a specified air flow rate so as to produce the specified air-fuel ratio;

a swirler air temperature sensor for measuring the temperature of the air delivered to the combustion chamber; and a controller for governing the rate of air delivery based at least on the temperature of the air delivered to the combustion chamber.

9. A system according to claim 8, further including:

a heater head temperature sensor for measuring the temperature of the heater head; and a controller for governing the rate of fuel delivery based at least upon the temperature of the heater head.

10. A system according to claim 8, further including:

a gas composition sensor for monitoring a gas concentration in the exhaust product of the burner, wherein the controller for governing the rate of air delivery includes a controller based at least upon the temperature of air delivered to the combustion chamber and the gas concentration in the exhaust gas product.

11. A system according to claim 8, further including a flow sensor for measuring the rate for fuel delivery wherein the controller for governing the rate of air delivery includes a controller based at least upon the temperature of the air delivered to the combustion chamber and the measured rate of fuel delivery.

12. A system according to claim 8, wherein the air temperature is estimated based on the temperature of the heater head.

* * * * *

UNITED STATES PATENT AND TRADEMARK OFFICE
CERTIFICATE OF CORRECTION

PATENT NO. : 6,247,310 B1
DATED : June 19, 2001
INVENTOR(S) : Michael Norris et al.

It is certified that error appears in the above-identified patent and that said Letters Patent is hereby corrected as shown below:

Delete Figure 8, and substitute therefor Figure 8, as shown on page.

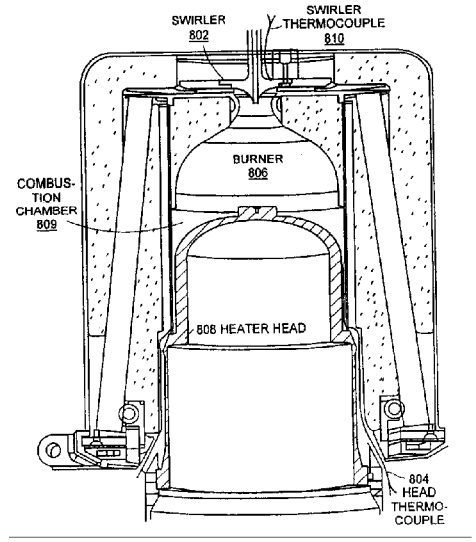

Signed and Sealed this

Thirteenth Day of July, 2004

JON W. DUDAS
*Acting Director of the United States Patent and Trademark Office*